Jan. 15, 1963
M. GRENIER
3,073,129
PROCESS FOR DEGASSING AN ETHYLENIC LIQUID
Filed Nov. 18, 1959
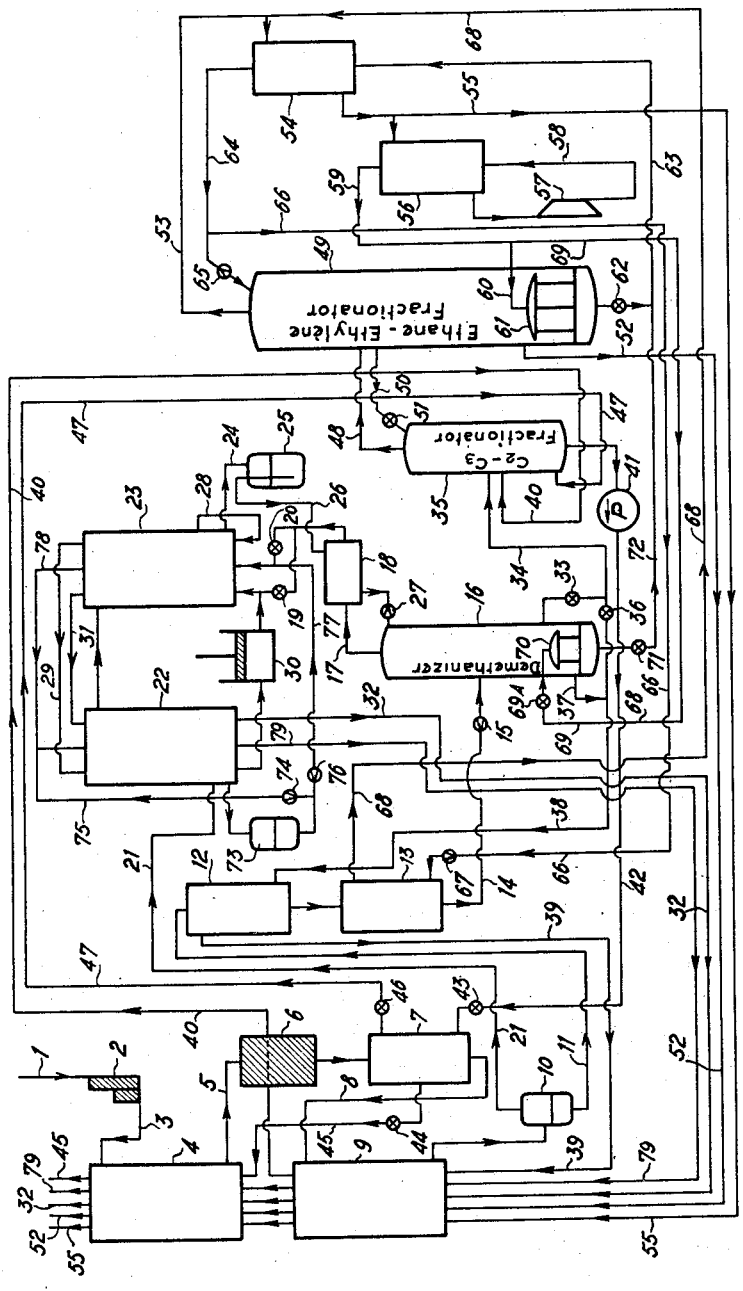
INVENTOR
MAURICE GRENIER
BY Irwin S. Thompson
ATTY.

United States Patent Office 3,073,129
Patented Jan. 15, 1963

3,073,129
PROCESS FOR DEGASSING AN ETHYLENIC LIQUID
Maurice Grenier, Paris, France, assignor to L'Air Liquide, Societe Anonyme Pour l'Etude et l'Exploitation des Procedes Georges Claude, Paris, France
Filed Nov. 18, 1959, Ser. No. 853,915
Claims priority, application France Nov. 28, 1958
5 Claims. (Cl. 62—28)

The present invention relates to a process for degassing and rectifying a liquid rich in ethylene and in ethane, which has been obtained by partial condensation of a gas mixture under pressure and at low temperature, for the purpose of eliminating the methane and other relatively volatile gases, and thereafter the $C_3$ hydrocarbons, and of separating the ethylene and the ethane, wherein the condensed liquid is allowed to expand to a relatively low pressure before being introduced into the degassing column, and a fraction of gaseous ethylene separated and compressed to a pressure higher than that of the column for the separation of the ethylene and of the ethane is condensed by heat exchange with the liquid ethane from the bottom of the said column, and thereafter allowed to expand and introduced into the top of the said column as reflux liquid.

Such an ethylene cycle under moderate pressure, by means of which a satisfactory separation of a mixture of ethylene and ethane can be effected, is inadequate if the mixture condensed under pressure contains a considerable quantity of $C_3$ hydrocarbons, propylene and propane. It is then necessary to effect a preliminary separation of the latter substances under high pressure. This separation is relatively difficult under this pressure, and it necessitates a considerable auxiliary cooling by means of a cooling fluid such as ammonia.

The process of the invention makes it possible to obviate the aforesaid disadvantages, to obtain pure ethylene and ethane fractions without the $C_3$ hydrocarbons having to be separated by a preliminary rectification under high pressure. It is possible by means of the said process completely to eliminate the methane from the liquid rich in ethylene and in ethane and then to separate the $C_3$ hydrocarbons from the $C_2$ hydrocarbons before proceeding with the separation of the ethylene and of the ethane, without the separation of the ethylene and of the ethane being disturbed.

The new process is characterized in that the degassed liquid is sent in to a column for the separation of the $C_3$ hydrocarbons from the ethylene and from the ethane under low pressure, which gives a mixture of ethylene and ethane which is sent in the gaseous state to the column for the separation of the ethylene and of the ethane, the reflux in the column for the separation of the $C_3$ hydrocarbons consisting of a liquid taken from the column for the separation of the ethylene and of the ethane, and in that another gaseous ethylene fraction compressed at a pressure at most equal to that of the first is condensed by heat exchange with the methane-free liquid from the bottom of the degassing column and thereafter allowed to expand and introduced into the top of the column for the separation of the ethylene and of the ethane as reflux liquid. In this way, the good operation of the methane degassing column and that of the column for the separation of the ethylene and the ethane are interrelated. The heating of the bottom of the methane degassing column provides an additional quantity of reflux liquid and increases the cooling at the top of the column for the separation of the ethylene and of the ethane without, however, simultaneously increasing the heating in the bottom of the latter. It is thus possible to separate the $C_3$ hydrocarbons from the $C_2$ hydrocarbons in a preliminary low-pressure rectification column by vaporisation of the latter and then to introduce them in the form of vapour into the final separation column, while maintaining sufficient purity of the ethylene by virtue of the increase in the reflux.

This excess of reflux consisting of the ethylene condensed in the heating of the degassing column not only renders possible ready starting and correct operation of the column for the separation of the ethylene and the ethane, but also makes it possible to provide in this column an excess of liquid which can be utilised as reflux at the head of the column for the low-pressure separation of the $C_2$ hydrocarbons and of the $C_3$ hydrocarbons.

The process of the invention also renders possible a very ready adjustment of the separation of the methane from the liquid rich in ethylene and ethane, which will hereinafter be called the "ethylenic liquid."

For this purpose, in accordance with one embodiment of the invention, the extent of the vaporisation of the liquid from the bottom of the column is varied, not by modifying the rate of flow of gas in heat exchange with the said liquid, but by changing the pressure under which the impure liquid is sent to the degassing column. The boiling temperature of the liquid in the bottom of the column and consequently the temperature difference between the liquid in the course of vaporisation and the ethylene in the course of condensation, of which the pressure and consequently the temperature are fixed, are thereby varied. It is also possible to adjust this degree of vaporisation by actuation of a valve called a "throttle valve," which sets up a pressure drop of the gaseous heating ethylene.

In accordance with another embodiment of the invention, the relatively low temperature of the ethylenic liquid free from methane is utilised to improve the separation of the hydrocarbons from the uncondensable gases by condensing the most volatile parts of the impure ethylenic liquid. For this purpose, a part of this liquid is not introduced directly into the column for the separation of the $C_3$ hydrocarbons; it is vaporised by heat exchange with the gas under pressure in the exchangers in which the said hydrocarbons undergo the partial condensation giving the ethylenic liquid still contaminated by methane, whereafter it is sent to the column for the separation of the $C_3$ hydrocarbons.

There will hereinafter be described with reference to the accompanying drawing, which is given by way of non-limiting example, an installation for the low-temperature separation of hydrocarbons in which the process of the invention is applied.

The said installation is intended to separate into its elements a gas mixture containing about 30% of light gases (hydrogen, nitrogen, carbon monoxide and methane), 40% of ethylene, 25% of ethane and about 5% of heavy products ($C_3$, $C_4$ and $C_5$ hydrocarbons). The gas mixture arriving through the duct 1 is brought to an absolute pressure in the neighborhood of 15 kg./cm.$^2$ by the compressor 2. It then passes through the duct 3 into the heat exchanger 4, in which it is cooled to $-40°$ C. by the gases separated at low pressure, which will hereinafter be described in detail. The water vapour, the benzene and certain other impurities condense and are collected in a special receptable, which has been omitted from the drawing for the sake of clarity. The gas then proceeds through the duct 5 into the absorbent mass 6 consisting, for example, of silica gel, which adsorbs the residual quantities of water vapour. The said adsorbent mass is periodically regenerated by heating in known manner. The gas thus dried goes to the heat exchanger 7, in which it is cooled to about $-55°$ C. by heat exchange with liquid $C_3$ hydrocarbons in the course of low-pressure vaporisation. It thereafter passes through the duct 8 into the exchanger 9, in which it is cooled to —85° C. in indirect exchange with a methane-free ethylenic liquid boiling at low pressure. The greater part of the ethylene, the ethane and the $C_3$ hydrocarbons of the mixture condense and entrain a quantity of methane in the dissolved state, and collect in the separator 10. The ethylenic liquid of the said separator is sent through the duct 11 to the exchanger 12, in which it is cooled with the aid of an ethylenic liquid fraction at low pressure which has been freed from methane. It is again cooled in the exchanger 13 with the aid of pure low-pressure ethylene and then sent through the duct 14 to the expansion valve 15, which reduces the absolute pressure thereon to about 2 kg./cm.². By reason of its expansion, it undergoes a partial vaporisation, in which a large part of the methane enters the gas phase. It then enters the degassing column 16. The methane leaves the top of the column by way of the duct 17, cools the liquid reflux methane in the exchanger 18, and is then combined by means of the valves 19 and 20 with cold fluids, the origin of which will hereinafter be indicated.

On the other hand, it is separated from the uncondensed gases in the separator 10. The said gases arrive through the duct 21 at the exchanger 22, in which they are cooled to about —90° C. by heat exchange with the uncondensable gases and the methane expanded at low pressure. A further methane-charged ethylene fraction condenses and is collected in the receptacle 73. A part is allowed to expand in the valve 74, is combined by way of the duct 75 with a cold low-pressure gas fraction arriving through the duct 78, and penetrates therewith into a nest of tubes in the exchanger 22, in counter-current with the low-pressure gas to be cooled. Another part is allowed to expand in the valve 76 and combined by way of the duct 77 with the methane emanating from the degassing column and arriving by way of the duct 77 and the valve 20.

The gas under pressure thereafter enters the exchanger 23, in which it is cooled to about —125° C. by heat exchange with expanded cold gases and with its unliquefied residue. A considerable quantity of methane condenses therein and passes through the duct 24 into the receiving vessel 25, whence a duct 26 leads it to the aforesaid exchanger 18. It is then allowed to expand in the valve 27 and introduced into the top of the degassing column 16 as reflux liquid.

The uncondensed residual gases at —125° C. return via the duct 28 into the exchanger 23, in counter-current with the gas to be cooled. They thereafter pass through the duct 29 into the exchanger 22, in which they are heated, and they are then expanded with external work in the expander 30 to an absolute pressure of about 2 kg./cm², and returned into the exchanger 23 after the addition thereto, through the valve 19, of a fraction of the methane emanating from the degassing column. They effect the cooling of the gas under pressure in the exchanger 23 and then pass through the duct 31 into the preceding exchanger 22, again in counter-current with the gas under pressure to be cooled. They are then sent through the duct 32 successively to the initial cooling exchangers 9 and 4 and are heated therein to a temperature in the neighborhood of the ambient temperature before being discharged.

On the other hand, a fraction of methane emanating from the degassing column, after addition of a fraction of the condensed liquid emanating from the receiver 73, expanded in the valve 76 and arriving by way of the duct 77, is successively heated in the exchanger 23, given an addition of another liquid fraction emanating from the receiver 73, heated in the exchanger 22 and then sent through the duct 79 to the initial cooling exchangers 9 and 5, in which it undergoes a final heating before being discharged.

The heating of the degassing column 16 is effected by the condensation in the boiler 70 of a current of ethylene under a pressure of 3.5 kg./cm², the circuit of which will hereinafter be described.

There is extracted from the bottom of the column 16 a methane-free liquid containing the $C_2$ and $C_3$ hydrocarbons. A fraction of this liquid is sent at a variable rate of flow through the valve 36 and, after addition by way of the valve 33 of a vaporised fraction also taken from the bottom of the column, through the duct 34 into the central zone of a column 35 which effects the separation of the $C_3$ hydrocarbons from the ethylene and from the ethane. Another fraction of the methane-free liquid from the column 16 is sent through the duct 38 to the exchanger 12, in which it is heated while cooling the impure ethylenic liquid, whereafter it flows through the duct 39 to the exchanger 9. After vaporisation in the latter, it returns by way of the duct 40 into the column 35, which it enters at a level slightly below that of the duct 34.

The column 35 gives at the top a gaseous fraction of ethylene and ethane, which is sent through the duct 48 into the central zone of the final column 49 for the separation of the ethylene and the ethane. A liquid fraction withdrawn from this final column substantially at the same level is sent through the duct 50 and the valve 51 to the top of the column 35 as reflux liquid. A liquid fraction rich in propane and propylene is withdrawn from the bottom of the column 35 by the pump 41 and sent through the duct 42 and the valve 43 to the heat exchanger 7, in which it is vaporised by heat exchange with the entering gas mixture under pressure. A part, which constitutes the separated fraction, is sent through the valve 44 and the duct 45 to the initial cooling exchanger 4 and then discharged. The other part is returned through the valve 46 and the duct 47 in the vaporous state into the bottom of the column 35. The exchanger 7 thus performs the function of a boiler for the column 35.

The column 49 for the separation of the ethylene and the ethane is thus fed with mixture to be separated in the vaporous state. It is cooled at the top and heated at the bottom with the aid of the ethylene cycle which will now be described. The pure gaseous ethylene leaves the top of the column at about —100° C. by way of the duct 53 at a pressure in the neighbourhood of atmospheric pressure. After the addition, by way of the duct 68, of another gaseous ethylene fraction whose origin will hereinafter be indicated, it is heated in the exchanger 54 in counter-current with the reflux liquid ethylene under pressure. One part, which constitutes the final product, is sent through the duct 55 to the preliminary exchangers 9 and 4 and leaves after having been heated to ambient temperature. The other part is heated in the exchanger 56 by the compressed ethylene, brought to an absolute pressure of 3.5 kg./cm.² by the compressor 57, and then returns through the duct 58 to the exchanger 56. After cooling in the latter, it is sent through the duct 59 and divided into two fractions, the first of which passes through the duct 60 into the heating vaporiser 61 at the bottom of the ethylene column 49, while the other passes through the duct 69 and the valve 69A into the heating vaporiser 70 of the degassing column 16. The two fractions liquefied at about —80° C. are combined by way of the valve 62, on the one hand, and by way of the valve 71 and the duct 72 on the other hand, and proceed through the duct 63 to the exchanger 54. After undercooling in the latter the liquid ethylene is sent through the duct 64 and the valve 65 into the top of the ethylene column 49. One part thereof is, however, previously tapped by way of the duct 66, allowed to expand in the valve 67, vaporised in the heat exchanger 13, thereby finally cooling the impure ethylenic liquid, and combined by way of the duct 68 with the gaseous ethylene under low pressure which emanates from the top of the column 49.

On the other hand, the pure ethane is extracted from the bottom of the column 49 in the liquid state at about −85° C. by way of the duct 52 and is then heated to ambient temperature in the exchangers 9 and 4.

Although the above installation has been described in fairly detailed fashion, it is to be understood that it is possible to modify such an installation in many respects without departing from the scope of the invention. More especially, the cooling for obtaining the liquid reflux methane at the top of the degassing column may be effected, not by expansion of the uncondensable gases with external work, but with the aid of a methane cycle, which is compressed, liquefied by cooling and then allowed to expand. The heat exchangers may also be modified to a large extent for effecting the best separation having regard to the composition of the gas mixture to be treated, but without departing from the principle of the invention.

What I claim is:

1. A process for separating in successive rectifying zones a liquid rich in ethylene and in ethane, which has been obtained by partial condensation at low temperatures of a gaseous mixture under pressure, into a fraction containing methane and other volatile gases, ethylene, ethane and a $C_3$ hydrocarbons fraction, comprising expanding said liquid to a relatively low pressure, then separating it by rectification in a first rectifying zone into a fraction containing methane and other volatile gases and a higher-boiling liquid $C_2$–$C_3$ hydrocarbons mixture, feeding said higher-boiling liquid $C_2$–$C_3$ hydrocarbons mixture into a second rectifying zone for the separation of a gaseous $C_2$ hydrocarbons mixture from a liquid $C_3$ hydrocarbons mixture, feeding said gaseous $C_2$ hydrocarbons mixture into a third rectifying zone for the separation of gaseous ethylene from liquid ethane at an intermediate level thereof, feeding a liquid stream taken from said third rectifying zone near said intermediate level back into said second rectifying zone as a reflux liquid, compressing a gaseous ethylene stream taken from said third rectifying zone, liquefying a first part thereof by indirect heat exchange with said first rectifying zone, liquefying a second part thereof by heat exchange with said third rectifying zone, and expanding both parts and bringing them back into said third rectifying zone as a reflux liquid.

2. A process according to claim 1, wherein the residual methane content of the higher-boiling liquid $C_2$–$C_3$ hydrocarbons mixture is adjusted by varying the relatively low pressure to which the liquid rich in ethylene and in ethane is expanded before being introduced into said first rectifying zone.

3. A process according to claim 1, wherein the residual methane content of the higher-boiling liquid $C_2$–$C_3$ hydrocarbons mixture is adjusted by varying the pressure under which the first part of the gaseous ethylene stream condenses.

4. A process for separating in successive rectifying zones a liquid mixture rich in ethylene and in ethane, which has been obtained by partial condensation at low temperatures of a gaseous mixture under pressure, into a fraction containing methane and other volatile gases, ethylene, ethane and a $C_3$ hydrocarbons fraction, comprising expanding said liquid to a relatively low pressure, separating it by rectification in a first rectifying zone into a fraction containing methane and other volatile gases and a higher-boiling liquid $C_2$–$C_3$ hydrocarbons mixture, feeding a first part of said higher-boiling liquid $C_2$–$C_3$ hydrocarbons mixture into a second rectifying zone for the separation of a gaseous $C_2$ hydrocarbons mixture from a liquid $C_3$ hydrocarbons mixture, vaporizing a second part of said higher-boiling liquid $C_2$–$C_3$ hydrocarbons mixture by heat exchange with the most volatile parts of the mixture rich in ethylene and in ethane, which are thereby liquefied, under substantially the same pressure as that of said first rectifying zone, feeding said vaporized second part of said higher-boiling $C_2$–$C_3$ hydrocarbons mixture into said second rectifying zone, feeding said gaseous $C_2$ hydrocarbons mixture separated in said second rectifying zone into a third rectifying zone for the separation of gaseous ethylene from liquid ethane, feeding a liquid stream taken from said third rectifying zone back into said second rectifying zone as a reflux liquid, compressing a gaseous ethylene stream taken from said third rectifying zone, liquefying a first part thereof by indirect heat exchange with said first rectifying zone, liquefying a second part thereof by heat exchange with said third rectifying zone, and expanding both parts and bringing them back into said third rectifying zone as a reflux liquid.

5. A process according to claim 4, wherein the gaseous mixture under pressure is cooled by heat exchange with a $C_3$ hydrocarbons liquid stream taken from the second rectifying zone, which is thereby vaporized, and a part of which is fed back into the bottom of said second rectifying zone.

References Cited in the file of this patent

UNITED STATES PATENTS

| | | |
|---|---|---|
| 1,853,743 | Pollitzer | Apr. 12, 1932 |
| 2,180,435 | Schlitt | Nov. 21, 1939 |
| 2,471,602 | Arnold | May 31, 1949 |
| 2,573,341 | Kniel | Oct. 30, 1951 |
| 2,600,110 | Hachmuth | June 10, 1952 |
| 2,645,104 | Kniel | July 14, 1953 |
| 2,765,635 | Redcay | Oct. 9, 1956 |
| 2,777,305 | Davison | Jan. 15, 1957 |